Oct. 11, 1938.  H. E. TRACY  2,132,885
MAGNETIC CHUCK
Filed Sept. 10, 1937  2 Sheets-Sheet 1
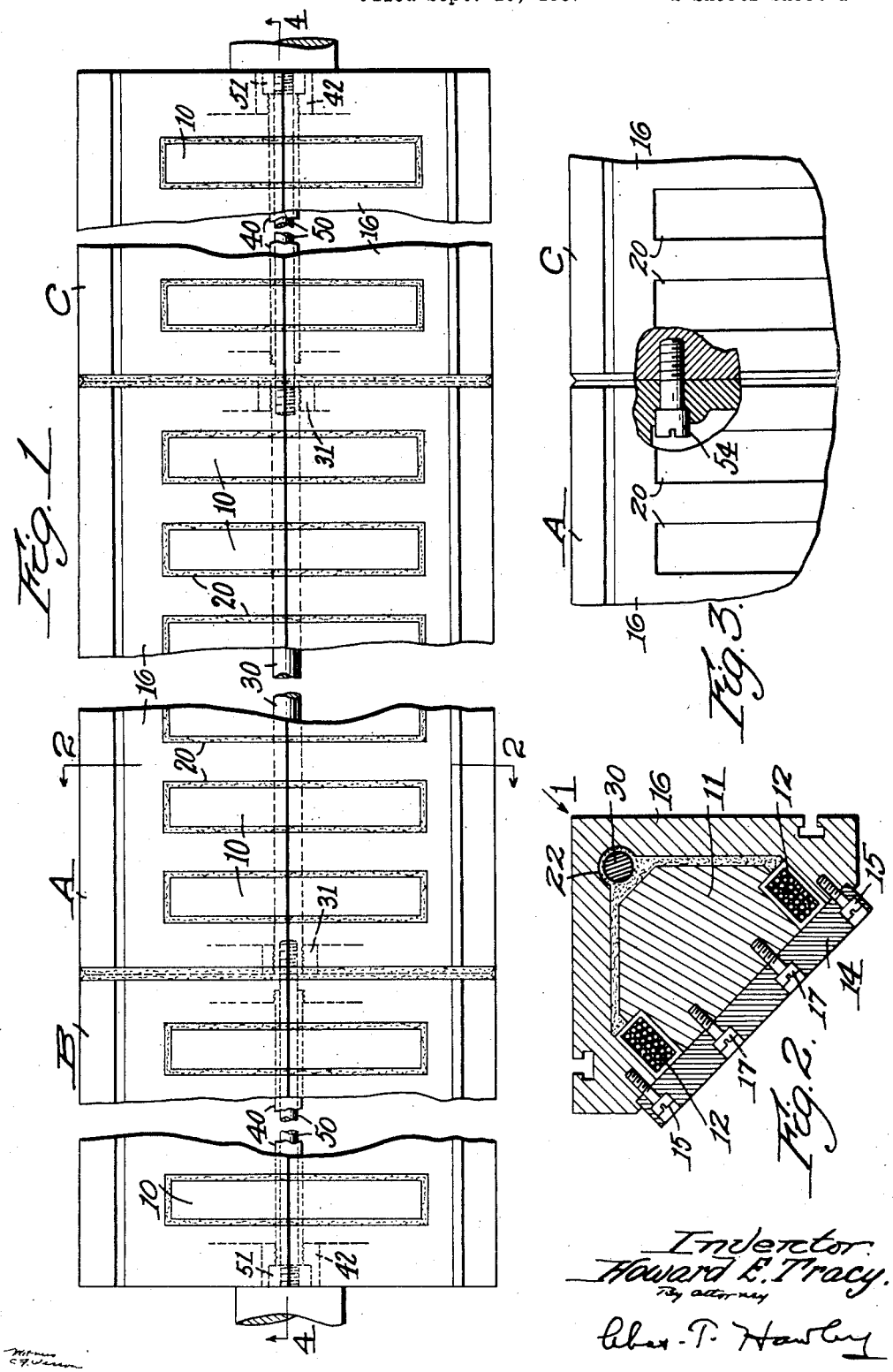

Oct. 11, 1938.  H. E. TRACY  2,132,885
MAGNETIC CHUCK
Filed Sept. 10, 1937  2 Sheets-Sheet 2
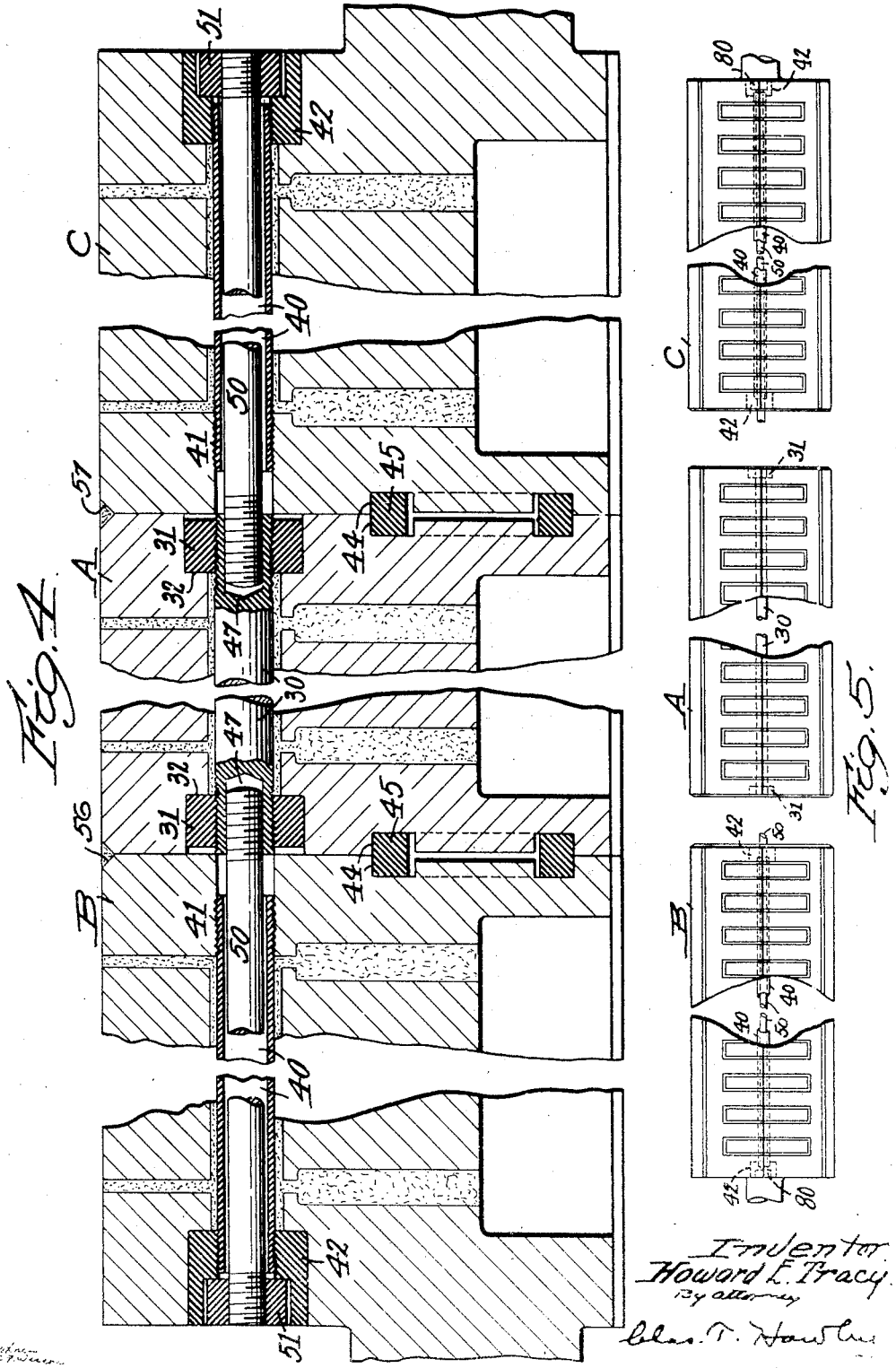

Patented Oct. 11, 1938

2,132,885

UNITED STATES PATENT OFFICE 2,132,885

MAGNETIC CHUCK

Howard E. Tracy, Worcester, Mass., assignor to O. S. Walker Co. Incorporated, Worcester, Mass., a corporation of Massachusetts Application September 10, 1937, Serial No. 163,253

6 Claims. (Cl. 175—367)

This invention relates to magnetic chucks such as are used to hold pieces of work in position for grinding or for machine operations thereon. In commercial practice, chucks for such purposes are demanded in lengths up to twenty feet or more but it has been found that single section chucks cannot be satisfactorily built in such lengths. Accordingly, my invention relates more particularly to magnetic chucks of substantial length which each comprise a plurality of chuck sections.

It is the general object of my invention to provide improved means for longitudinally reenforcing the separate chuck sections and preventing endwise spreading or displacement of their parts, together with improved means for assembling a plurality of aligned sections to form a single unitary magnetic chuck.

My invention further relates to arrangements and combinations of parts which will be hereinafter described and more particularly pointed out in the appended claims.

A preferred form of the invention is shown in the drawings, in which

Fig. 1 is a partial angular view of a magnetic chuck of substantially triangular cross section, and looking in the direction of the arrow 1 in Fig. 2;

Fig. 2 is a transverse sectional elevation, taken along the line 2—2 in Fig. 1;

Fig. 3 is a detail view, broken away to show interior structure;

Fig. 4 is a longitudinal sectional view, taken along the line 4—4 in Fig. 1; and Fig. 5 is an angular view showing three chuck sections in spaced relation.

Referring to the drawings, I have shown my invention embodied in a magnetic chuck of the type which is substantially triangular in cross section and in which pole pieces 10 extend continuously around a right-angle corner of the chuck, with holding portions in each of two perpendicularly disposed chuck surfaces.

The pole pieces 10 are preferably formed in forked pairs on cores 11, each of which cores is provided with a magnet coil 12. In making these chucks, the pole pieces 10, cores 11 and magnet coils 12 are inserted in the chuck from the lower side. A bottom plate 14 is then secured by screws 15 to the chuck frame 16 and additional screws 17 are inserted to secure the cores 11 firmly to the plate 14.

For a more complete description of the details of construction of the chuck shown in the drawings, reference is made to my prior application, Serial No. 22,325, filed by me May 20, 1935. My present invention is not limited, however, to this particular type of chuck.

After the parts of a short one-section chuck of this general construction are assembled, the pole pieces 10 project loosely into corresponding openings 20 in the chuck body 16. The spaces between the pole pieces and the walls of the associated openings 20 are then filled with type metal or other suitable metal alloy, and this metal is then hammered or calked to securely seal the openings around the pole pieces and thus render the chuck water-proof.

The calking operation, however, has a strong tendency to spread the component parts of the chuck longitudinally, thus distorting the chuck body, and more particularly lengthening the right angle corner thereof.

To prevent this objectionable distortion, it has been customary to provide cored openings 22 in the chuck body, through which a reenforcing rod or tie rod was inserted before the type metal was calked. This rod prevented longitudinal expansion of the chuck so that the distortion of the chuck body during calking was avoided.

The particular problem to which my present invention is directed is the provision of a suitable reenforcing means for each of a plurality of separate chuck sections, as A, B and C (Fig. 1), in combination with means for thereafter securing the several reenforced sections to form a substantially unitary structure.

To the accomplishment of this purpose I insert a tie rod 30 (Fig. 4) in the cored openings of the middle chuck section A. The tie rod 30 is preferably externally threaded at each end to receive clamping nuts 31, seated in recesses 32 in the opposite end faces of the chuck. When these nuts are suitably adjusted, they firmly engage the inner faces of the recesses 32 and prevent endwise spreading or distortion of the chuck section A.

The chuck sections B and C are similarly provided with tubular reenforcing rods 40, each of which is preferably threaded into the chuck body at one end, as indicated at 41, and is externally threaded at the other end to receive a clamping nut 42. The nuts 42, when adjusted, will hold the chuck sections B and C from endwise distortion during the calking operation.

Obviously two clamping nuts 42 might be used in the end sections B and C if desired, or one end of the rod 30 might be threaded into one end of the middle section A. These slight modifications are indicated in Fig. 5.

As a further slight modification, the rods 50 and nuts 51 may be made integral as bolts 80 (Fig. 5).

After each chuck section has been reenforced, the several body sections of the chuck are then brought together. In order to accurately align adjacent chuck sections, the adjoining faces of the sections are recessed as indicated at 44 to receive centering rings 45.

The reenforcing rod 30 of the middle chuck section A is provided with threaded holes 47 at its ends to receive the threaded inner ends of assembly bars 50, which bars extend freely through the reenforcing tubes 40 in the end sections B and C. Nuts 51 are threaded to the outer ends of the assembly bars 50 and are tightened up against shoulders on the nuts 42 to firmly clamp the several chuck sections together.

In assembling the chucks, the pole pieces 10 and cores 11 are first placed in the different chuck sections and the reenforcing rod 30 and reenforcing tubes 40 are then inserted and secured. The calking operation previously described is then performed on each chuck section separately, after which the different sections are aligned by the centering rings 45 and are secured together by the assembly bars 50 and nuts 51. This complete assembling of the chuck sections takes place before the magnet coils are inserted, thus making it possible to insert holding screws 54 (Fig. 3) between adjacent chuck sections for additional security.

After the chuck sections are thus assembled, the beveled ends of adjacent sections provide V-shaped notches 56 and 57 (Fig. 4) between adjacent sections, which are then filled with steel or other metal inserted by a welding operation, so that a smooth and continuous finished chuck surface may be attained throughout the entire length of a long chuck.

After the chuck body is thus assembled and finished, the bottom plate 14 is removed, the magnet coils are inserted and suitably connected and the bottom plate is replaced. The chuck is then complete and operative.

By the construction described, I provide convenient means by which each of several sections of a long chuck may be conveniently reenforced and held from endwise distortion, together with convenient means by which a desired number of chuck sections may be assembled and securely held in accurately aligned relation.

As many sections B and C may be provided as are desired.

Having thus described my invention and the advantages thereof, I do not wish to be limited to the details herein disclosed, otherwise than as set forth in the claims, but what I claim is:—

1. A magnetic chuck comprising a plurality of separate chuck sections, a separate device to longitudinally reenforce each section, and means coaxial with said reenforcing devices effective to hold said sections in assembled longitudinal alignment.

2. A magnetic chuck comprising a plurality of separate chuck sections, a separate device to longitudinally reenforce each section, means to align adjacent sections, and means coaxial with said reenforcing devices effective to hold said sections in assembled relation.

3. A magnetic chuck comprising a plurality of separate chuck sections, a longitudinally extending clamping device to longitudinally reenforce each section, and means coaxial with said clamping devices effective to hold said sections in assembled longitudinal alignment.

4. A magnetitc chuck comprising a plurality of separate chuck sections, reenforcing means for a middle section, reenforcing tubes extending through and secured in other chuck sections, and assembly bars extending through said tubes and secured to said reenforcing means for said middle section, and securing said separate chuck sections in assembled longitudinal alignment.

5. A magnetic chuck comprising a plurality of separate chuck sections, reenforcing means for a middle section comprising a reenforcing rod extending through and secured in said section and having a threaded hole in each end thereof, reenforcing tubes extending through and secured in other chuck sections, and assembly bars extending through said tubes and threaded in the ends of said reenforcing rod and securing said chuck sections in assembled longitudinal alignment.

6. A magnetic chuck comprising a plurality of separate chuck sections, reenforcing means for a middle section comprising a reenforcing rod extending through and secured in said section and having a threaded hole in each end thereof, reenforcing tubes extending through and secured in other chuck sections, assembly bars extending through said tubes and threaded in the ends of said reenforcing rod, and clamping nuts threaded on the outer ends of said assembly bars and securing said chuck sections in assembled longitudinal alignment.

HOWARD E. TRACY.